United States Patent
Carey et al.

(10) Patent No.: US 12,136,004 B2
(45) Date of Patent: *Nov. 5, 2024

(54) STANDARDIZED INTERACTIONS ACROSS DIFFERENT BLOCKCHAINS

(71) Applicant: BlockJoy, Inc., Boston, MA (US)

(72) Inventors: Sean Carey, Boston, MA (US); Christopher Bruce, Boston, MA (US)

(73) Assignee: BlockJoy, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,831

(22) Filed: Oct. 9, 2023

(65) Prior Publication Data

US 2024/0036950 A1 Feb. 1, 2024

Related U.S. Application Data

(63) Continuation of application No. 18/205,349, filed on Jun. 2, 2023, now Pat. No. 11,847,511.

(60) Provisional application No. 63/348,790, filed on Jun. 3, 2022.

(51) Int. Cl.
*G06F 9/54* (2006.01)

(52) U.S. Cl.
CPC .............. *G06F 9/543* (2013.01); *G06F 9/546* (2013.01)

(58) Field of Classification Search
CPC .................................. G06F 9/541; G06F 9/546
See application file for complete search history.

(56) References Cited

U.S. PATENT DOCUMENTS

| | | |
|---|---|---|
| 2020/0201681 A1* | 6/2020 | Thompson ............ G06F 9/5027 |
| 2020/0349125 A1 | 11/2020 | Earley et al. |
| 2021/0103582 A1 | 4/2021 | Wentworth et al. |
| 2021/0304191 A1* | 9/2021 | O'Grady .............. G06Q 20/065 |
| 2022/0121466 A1 | 4/2022 | Gasperowicz et al. |
| 2023/0156455 A1 | 5/2023 | Salkinzis |

OTHER PUBLICATIONS

"Overview—Universal API", https://docs.blockdaemon.com/reference/universal-api-overview, first downloaded Apr. 19, 2022.

* cited by examiner

*Primary Examiner* — Andy Ho
(74) *Attorney, Agent, or Firm* — Jeffrey Schox; Diana Lin

(57) ABSTRACT

In variants, the system can include a set of blockchain modules and a set of interaction mechanism handlers configured to convert a unified set of system commands into blockchain-specific commands for each of a set of blockchains and/or blockchain nodes.

7 Claims, 11 Drawing Sheets

100

```
                    BLOCKCHAIN MODULE
protocol = "helium"

[babel]
version = "beta1"

[turnstile]
enabled = true
  [turnstile.red]
  cores = 3
  ram = "6G"
  nice = 10
  command =  "write command here for config change"

[turnstile.green]
  cores = 6
  ram = "11G"
  nice = -10
  command =  "write command here for config change"

[meta]
version = "1.8.3-beta1"
node_type = "validator"
artifact = "https://storage.blockjoy.com/proto/helium/MS44LjMtYmV0YTEK"
checksum = "72581bda0586561dd7397e983059c186"
description = "blockchain for p2p wireless services"

[monitor]
pid_file = "/blockjoy/var/run/validator.pid"

[commands]

[commands.start]
  type = "sh"
  desc = "start the helium validator"
  body = "/blockjoy/bin/miner daemon"

[commands.start.response]
    response = "sh"
    code = 0 #must match
    field = "blob"
    validate = "none"
    check = "none"

[commands.stop]
  type = "sh"
  desc = "stop the helium validator"
  body = "/blockjoy/bin/miner stop"

[commands.stop.response]
    response = "sh"
    code = 0 #must match
    field = "blob"
    validate = "none"
    check = "none"

[commands.height]
  type = "jrpc"
  desc = "get the blockchain height from this node"
  body = "http://localhost:4467/block_height"
  ...
```

```
...

[commands.name]
  type = "jrpc"
  desc = "get the name of the validator"
  body = "http://localhost:4467/info_name"

[commands.address]
  type = "jrpc"
  desc = "get the address of the validator"
  body = "http://localhost:4467/peer_addr"

[commands.address.response]
    response = "jrpc"
    code = 200
    field = "address"
    validate = "regex"
    check = "[a-zA-Z]{0,255}"

[commands.kill]
  type = "sh"
  desc = "send the kill command to the helium validator"
  body = "kill `pidof beam.smp`"

[commands.kill9]
  type = "sh"
  desc = "send kill -9 to the helium validator"
  body = "kill -9 `pidof beam.smp`"

[commands.status]
  type = "jrpc"
  desc = "get the status of the helium valiator"
  body = "http://localhost:4467/ping"
```

```
BLOCKCHAIN MODULE
// babel
const METADATA = #{
  requirements: #{
    vcpu_count: 4,
    mem_size_mb: 512,
    disk_size_gb: 10,
  },
  config: #{
    min_babel_version: "0.10.0",
    node_version: "0.0.1",
    protocol: "validator",
  },
  nets: #{
    test: #{
      url: "test_url",
      net_type: "test",
      some_custom: "metadata",
    },
    main: #{
      url: "main_url",
      net_type: "main",
    },
  },
};
...
```

```
...
fn init() {
  sanitize_sh_param(PARAMS.net_name);
  run_sh("/blockchain/init " + global::METADATA.config.protocol);

start_job("download blob", #{
    body: "curl " + global::METADATA.nets[PARAMS.NETWORK].url + " > /blockjoy/aptos/genesis.blob",
    restart: #{
      "on-failure": #{
        max_retries: 3,
        backoff_timeout_ms: 1000,
        backoff_base_ms: 500,
      },
    },
  });
  start_job("extract blob", #{
    body: "axel -o /blockjoy/aptos/node/aptos.tar.lz4 -n 10 http://sw/aptos.tar.lz4 2>&1",
    restart: "never",
    needs: ["download blob"],
  });
  start_job("fullnode runner", #{
    body: "/blockjoy/aptos/aptos-node -f /blockjoy/aptos/fullnode.yaml",
    restart: #{
      "always": #{
        backoff_timeout_ms: 1000,
        backoff_base_ms: 500,
      },
    },
    needs: ["extract blob"],
  });
} fn status() {
  job_status("fullnode runner");
} fn version() {
  run_sh("miner version").split("\n").last();
}
```

FIGURE 9

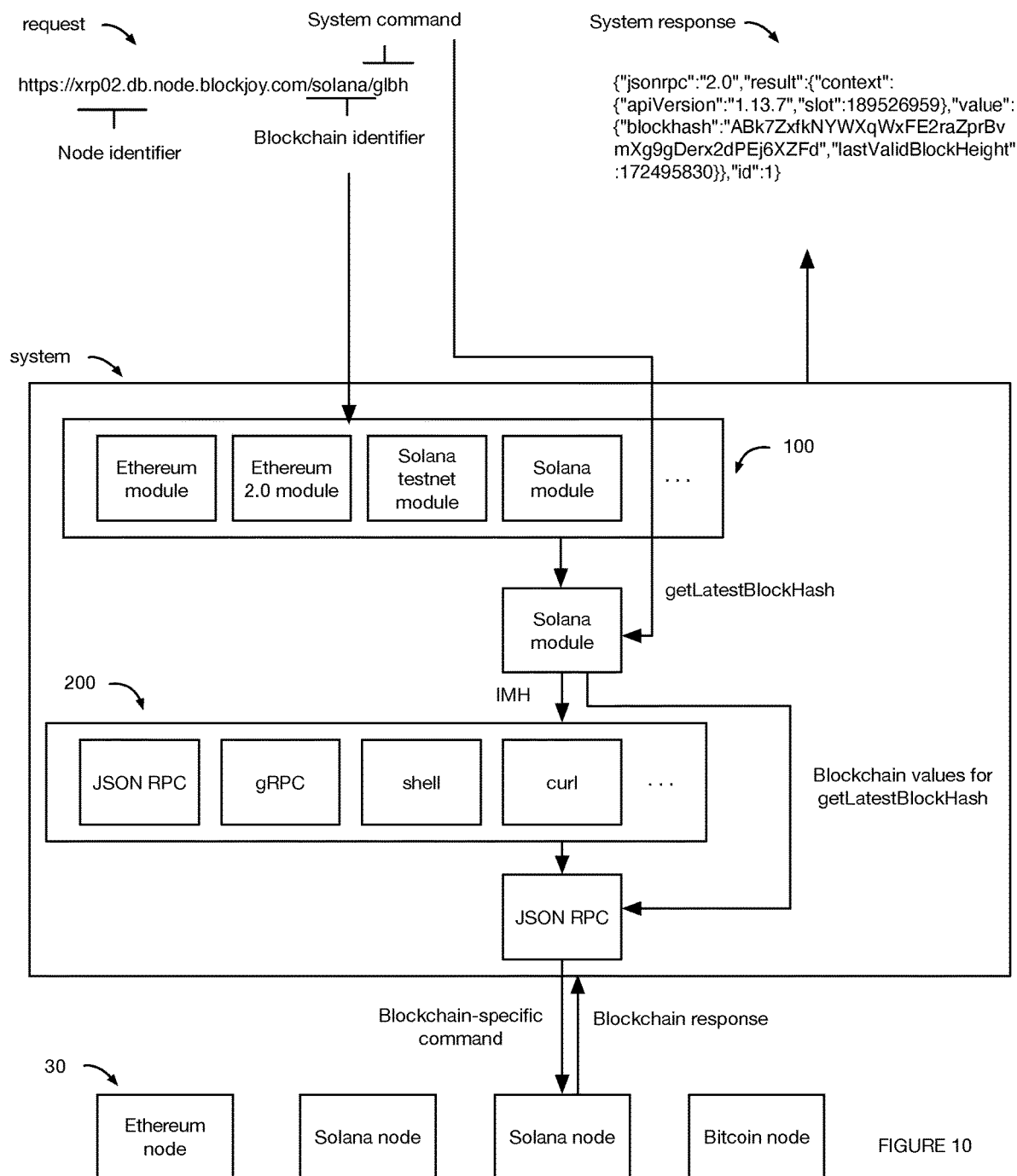

STANDARDIZED INTERACTIONS ACROSS DIFFERENT BLOCKCHAINS

CROSS-REFERENCE TO RELATED CASES

This application is a continuation of U.S. application Ser. No. 18/205,349 filed 2 Jun. 2023, which claims the benefit of U.S. Provisional Application No. 63/348,790 filed 3 Jun. 2022, each of which is incorporated in its entirety by this reference.

TECHNICAL FIELD

This invention relates generally to the blockchain field, and more specifically to a new and useful system and method for standardized interaction across different blockchains in the blockchain field.

BRIEF DESCRIPTION OF THE FIGURES

FIG. 8 is an illustrative example of a first variant of the blockchain module.

FIG. 9 is an illustrative example of a second variant of the blockchain module.

FIG. 10 is an illustrative example of a system command request and a corresponding system response.

DETAILED DESCRIPTION

The following description of the embodiments of the invention is not intended to limit the invention to these embodiments, but rather to enable any person skilled in the art to make and use this invention.

1. Overview

Figure 1:
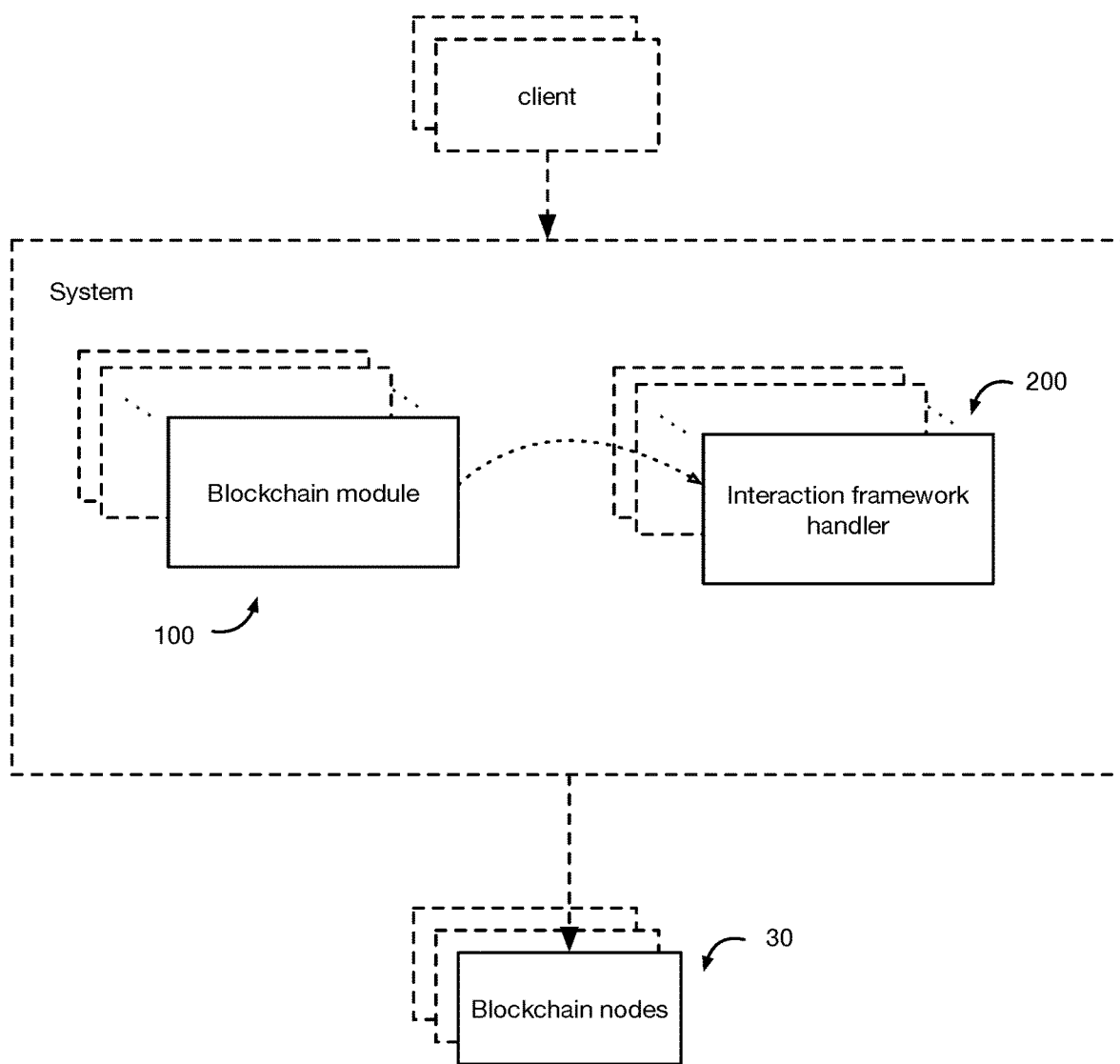
FIG. 1 is a schematic representation of a variant of the system.

As shown in FIG. 1, variants of the system can include a set of blockchain modules and a set of interaction mechanism handlers. The system can function to enable a client to interface with nodes of different blockchains using the same set of system commands.

In an illustrative example, the system can include a set of standard commands (e.g., standard API calls) that can be used to interact with the blockchain nodes for a plurality of blockchains (e.g., blockchain protocols), and/or interact with a heterogeneous set of blockchains. In a first variant, the system can include: a different blockchain module for each blockchain supported by the system, and a set of interaction mechanism handlers. Each blockchain module can, for each standard command (of the same set of standard commands): identify which the interaction mechanism handler to use to construct the blockchain-specific command that corresponds to the standard command, and specify the blockchain-specific payload to be used to construct the blockchain-specific command that corresponds to the standard command. The blockchain module can optionally include response parsing instructions associated with each standard command. The parsing instructions can include: which blockchain-specific interaction mechanism handler to use (e.g., to interpret the response), the expected response code value, the response field of interest, the validation logic to apply to the values in the response field, and/or the check values that the response field value should be validated against. Each interaction mechanism handler is preferably specific to an interaction mechanism (e.g., shell script, curl scripts, etc.), protocol (e.g., RPC, HTTPx, etc.), or language (e.g., JSON, Go, etc.), and can include templates for system command construction (e.g., according to the interaction mechanism, in the respective protocol, etc.), using the payloads specified in the blockchain modules. The interaction mechanism handlers can also parse responses (e.g., identify fields, etc.). In a second variant, the blockchain module can directly include the blockchain-specific commands associated with each standardized system command.

In an illustrative example of system operation (e.g., examples shown in FIG. 3, FIG. 4, FIG. 6, FIG. 7, and FIG. 10), the system can receive the same standard call for a set of heterogeneous blockchain nodes executing different blockchain protocols (e.g., "node.height( )"). In response to standard call receipt, the system can retrieve the blockchain modules associated with each blockchain node; identify the interaction mechanism associated with the standard call from each blockchain module; identify the payload values associated with the standard call from each blockchain module; and pass the payload values to the handlers for each identified interaction mechanism. The interaction mechanism handlers can then generate the blockchain-specific commands using: a system command template (e.g., defined by the interaction mechanism handler), the payload, and optionally any node-specific information passed by the client (e.g., port numbers, node identifiers, etc.). Alternatively, the blockchain-specific commands can be directly retrieved from the respective blockchain modules. The resultant blockchain-specific commands can then be used to interact with each blockchain node. In variants, responses from the blockchain node can be received, parsed, and/or processed by the interaction mechanism handler associated with the system command response (e.g., specified in the respective blockchain module). For example, the interaction mechanism handler can extract the field values for a field identified by the blockchain module; optionally call a validator (also identified by the blockchain module); and pass the field values and a check value (also from the blockchain module) to the validator, wherein the validation results can be returned to the client.

2. Technical Advantages

This technology can confer several technical advantages over conventional systems.

First, variants of this technology enable a client or program to interact with a heterogeneous set of blockchains using a set of unified, standard commands (e.g., a standard API). In examples, this can be enabled by the system architecture, which automatically handles blockchain system command conversion into a blockchain-native format. In a specific example, this can be enabled by the blockchain modules, which map standard commands to the interaction mechanism used by the blockchain for the system command (which can vary across system commands and/or responses for the same blockchain) and the payload values specific to the analogous blockchain-specific command. In another specific example, this can be enabled by a second variant of the blockchain modules, which map standard commands to a blockchain-specific command.

In variants, using a set of standard commands can also enable the technology to be programming language and/or interface agnostic (e.g., responsive to Python, Go, etc.). For example, the system can receive a REST API request (e.g., sent to a content delivery network (CDN) for any blockchain for any standard command (e.g., "api.blockjoy.com/solana.blockheight( )"), wherein the API request is converted to the blockchain-specific command corresponding to the standard command using the respective blockchain module, the blockchain response is parsed using the respective blockchain module, and an HTTP response (e.g., standard HTTP response) is generated and returned based on the parsed blockchain response.

Second, variants of the technology can directly interact with the blockchain nodes and/or blockchain networks (e.g., directly submit calls and requests to the blockchain node), using the native blockchain protocol, in real- or near-real time. This is in contrast with ETL systems, which indirectly interact with the blockchain. ETL systems extract blockchain node data from each blockchain (e.g., in a blockchain-native format), transform the data into custom format, store the data in an intermediary database, then query against the transformed data (e.g., using an API that is specific to the custom format). In other words, in variants, the technology directly queries against the blockchain node instead of a transformed dataset, without requiring an intermediary database. Additionally or alternatively, the technology can include an ETL system.

Third, variants of this technology enable blockchains to be rapidly onboarded onto the system. For example, instead of writing a new client, program, or interaction module for the new blockchain, a new blockchain can be easily onboarded by specifying which interaction mechanism to use for each system command (and/or response), and by specifying the blockchain payload values to use for each system command.

Fourth, variants of the technology can enable blockchains to be more responsive and more easily maintained. In an example, by sharing blockchain modules across blockchain nodes of the same blockchain type or protocol and by referencing the shared blockchain modules to construct the blockchain-specific calls in real- or near-real time (e.g., just-in-time), any updates to the blockchain modules are immediately reflected for all blockchain nodes in the next system command. In another example, when a blockchain protocol switches to using a new interaction mechanism, the interaction mechanism handler specified in the respective blockchain module can simply be updated, instead of having to manually specify the new blockchain-specific command.

Fifth, variants of this technology can include an agent or daemon that enables message passing between the blockchain node (e.g., executing in an isolated computing environment) and the system's orchestration layer.

Sixth, variants of this architecture can enable logic and module reuse, which can drastically reduce the computational resources (e.g., memory and processing power) required to execute the system. For example, the same interaction mechanism handler can be reused to generate system commands for multiple blockchains, and the same blockchain module can be reused to generate system commands for multiple blockchain nodes.

Seventh, variants of the technology can cache responses to the blockchain calls, wherein the cache can be used to respond to subsequent instances of the same call, instead of sending the call to the blockchain node itself. This can reduce the load on the blockchain node and/or increase the request response time (e.g., by responding from a physically collocated cache instead of a remote blockchain node).

However, further advantages can be provided by the system and method disclosed herein.

3. System

In variants, the system can include a set of blockchain modules 100 and a set of interaction mechanism handlers. The system can optionally include a set of validation modules and/or any other set of components. The system can be executed by: a runtime process operatively connected to one or more blockchain nodes; a client (example shown in FIG. 7); and/or any other suitable process.

Figure 2:
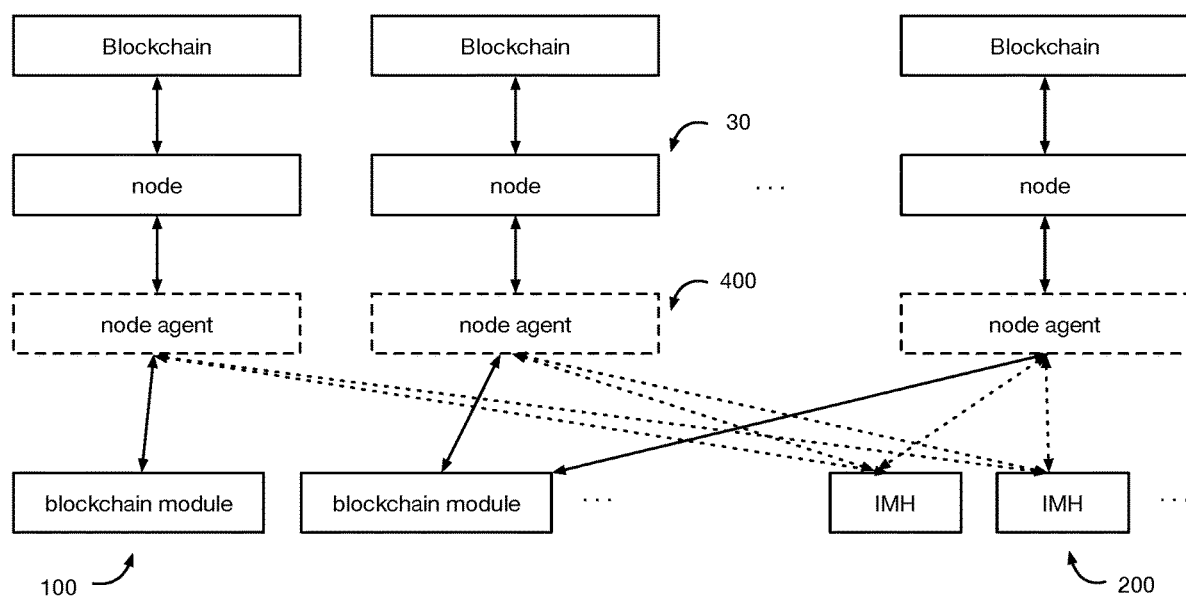
FIG. 2 is a schematic representation of an example of blockchain, blockchain node, blockchain module, and interaction mechanism handler interaction.

As shown in FIG. 2, the system can be used with a set of blockchains. The blockchains within the set are preferably heterogeneous (e.g., different), but can alternatively be the same. Different blockchains can implement different blockchain protocols, each with its own set of blockchain-specific commands, or implement the same blockchain protocol (e.g., be a parallel network, such as a testnet vs. mainnet). The blockchain-specific commands for the same type of blockchain interaction can have different names, use different interaction mechanisms (e.g., one blockchain protocol can use JSON-RPC, while other protocols use shell scripts, APIs, or gRPC), and/or otherwise vary. Examples of blockchains that can be used with this system can include: Helium, Solana, Ethereum, Bitcoin, Ethereum 2.0, Algorand, Avalanche, and/or other blockchains. Examples of blockchain networks that can be used with this system can include: Helium mainnet, Solana mainnet, Ethereum mainnet, Bitcoin mainnet, Ethereum 2.0 mainnet, Algorand mainnet, Avalanche mainnet, Helium testnet, Solana testnet, Ethereum testnet, Bitcoin testnet, Ethereum 2.0 testnet, Algorand testnet, Avalanche testnet, and/or any other suitable network.

Figure 3:
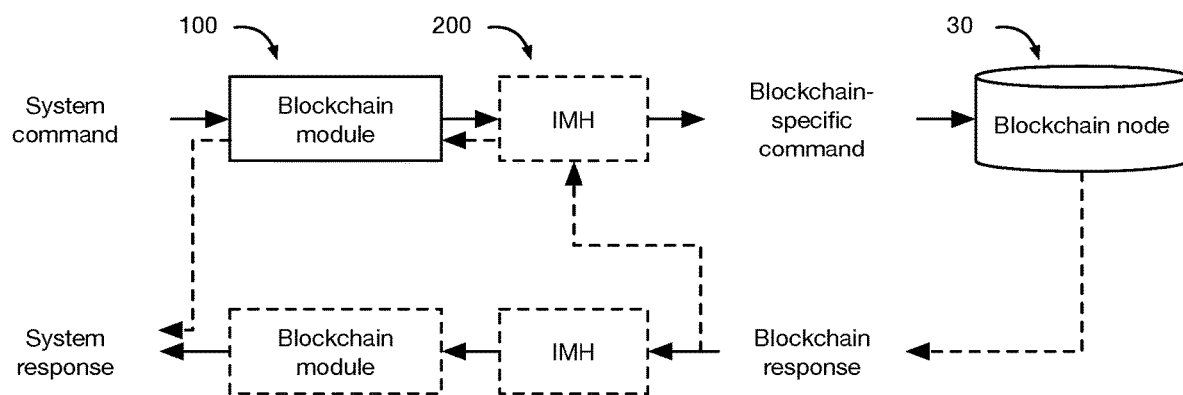
FIG. 3 is a schematic representation of an example of interacting with a blockchain node using system commands (e.g., standardized commands).
Figure 4:
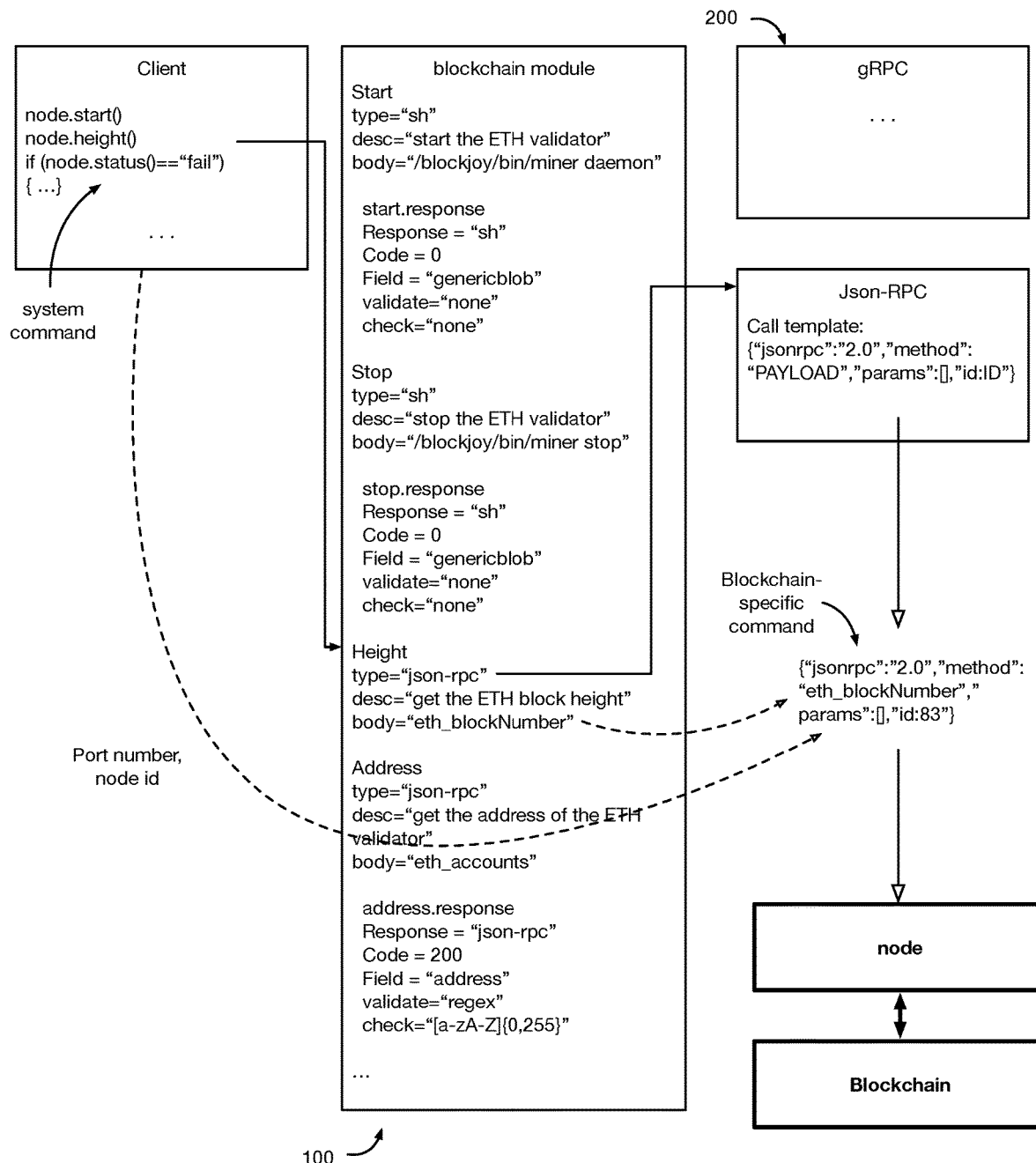
FIG. 4 is an illustrative example of generating a blockchain-specific command for a standard command.

As shown in FIG. 1, FIG. 2, and FIG. 3, the system can be used to interact with a set of blockchain nodes.

Each blockchain node 30 can be associated with a blockchain (e.g., blockchain network, blockchain protocol, etc.), but can alternatively be associated with multiple blockchains. The blockchain nodes are preferably connected to, synchronized with, and function to interact with (e.g., are communicatively connected to) a respective blockchain network, but can be otherwise constructed. For example, the blockchain nodes can: synch blocks, synch transactions (e.g., verified or unverified transactions), generate blocks (e.g., be a miner, be a block proposer), validate blocks (e.g., be a validator, be involved in consensus), certify blocks, stake assets, and/or otherwise interact with the blockchain. The blockchain nodes can also enable off-chain systems to interact with the blockchain. For example, off-chain systems can: read the blockchain state from the node, query the blockchain and/or other nodes via the node, submit transactions to the blockchain via the node, and/or otherwise interact with the node.

Each blockchain node 30 is preferably responsive to blockchain-specific calls (blockchain-specific command, blockchain-specific request, etc.) in the blockchain protocol for the blockchain, but can alternatively be responsive to any other suitable set of calls. The blockchain-specific calls can be generated by the system described herein, be generated by an external endpoint, and/or be otherwise generated.

The set of blockchain nodes are preferably managed nodes (e.g., under system control), but can additionally or alternatively be unmanaged nodes (e.g., outside of system control). The set of blockchain nodes can be physically collocated, dispersed (e.g., located in different facilities, in different countries, etc.), and/or otherwise located.

Each blockchain node 30 can be a process or machine executing a blockchain protocol from the blockchain set. When the blockchain node 30 is a process, the blockchain node 30 can execute on a computing environment (e.g., an isolated virtual space), such as a container, zone, virtual private server, partition, virtual environment, kernel, machine (e.g., bare metal machine), and/or other computing environment. The computing environment can be controlled by an orchestration layer, an agent or daemon executing within or alongside the blockchain node process, and/or by any other suitable management system. The management system can control computing resource allocation to the blockchain nodes (e.g., by controlling computing resource allocation to the node process, the node's computing environment, etc.), and/or otherwise control the computing environment.

Each node can be associated with a node identifier (e.g., an address, a name, a process identifier, etc.), port information, and/or other node-specific information. Each node can be associated with a set of users (e.g., user accounts) that own the node, are beneficiaries of any returns generated by the node, are authorized to interact with the node (e.g., submit system commands to the node), and/or are otherwise associated with the node. Each node can additionally or alternatively be associated with a management entity that controls node operation (e.g., provisioning, resource allocation, etc.), wherein the management entity can be the same as, different from, or have overlapping users with the user set.

Each blockchain node 30 within the set is preferably associated with a blockchain module. A blockchain node 30 is preferably associated with a single blockchain module, but can alternatively be associated with multiple blockchain modules 100. The blockchain module 100 can be specific to the blockchain node 30 (e.g., identified in the blockchain node's configuration, log, storage, etc.), specific to the blockchain node type, specific to the blockchain network that the node is connected to, specific to the blockchain protocol that the node is executing, and/or otherwise specific or generic.

A blockchain module 100 functions to specify the blockchain-specific information needed to construct a blockchain-specific command, and can abstract blockchain-specific interactions into a standard interaction framework. The blockchain module 100 can optionally specify the blockchain-specific information (e.g., the minimum amount of blockchain-specific information) needed to interpret a blockchain response; identify the blockchain network (and/or node) that the blockchain module 100 should be used for; include blockchain node initialization information (e.g., which machines to initialize, how many machines to initialize, what computing resources to allocate to the node, a link to the executable binary for the blockchain network, initialization validation information, etc.; e.g., examples shown in FIG. 8 and FIG. 9); specify the filepath that node artifacts and/or other information should be written to; and/or other information.

The system can include one or more blockchain modules 100 (e.g., for different blockchain protocols, blockchain networks, blockchain node types, blockchain nodes, etc.). A blockchain module 100 can be associated with a blockchain protocol, a blockchain node, a blockchain network, and/or otherwise associated with a blockchain. Each blockchain protocol is preferably associated with a single blockchain module, but can alternatively be associated with multiple blockchain modules 100. Each blockchain node 30 is preferably associated with a single blockchain module, but can alternatively be associated with multiple blockchain modules 100. A blockchain module 100 is preferably associated with a single blockchain, but can alternatively be associated with multiple blockchains.

Figure 11:
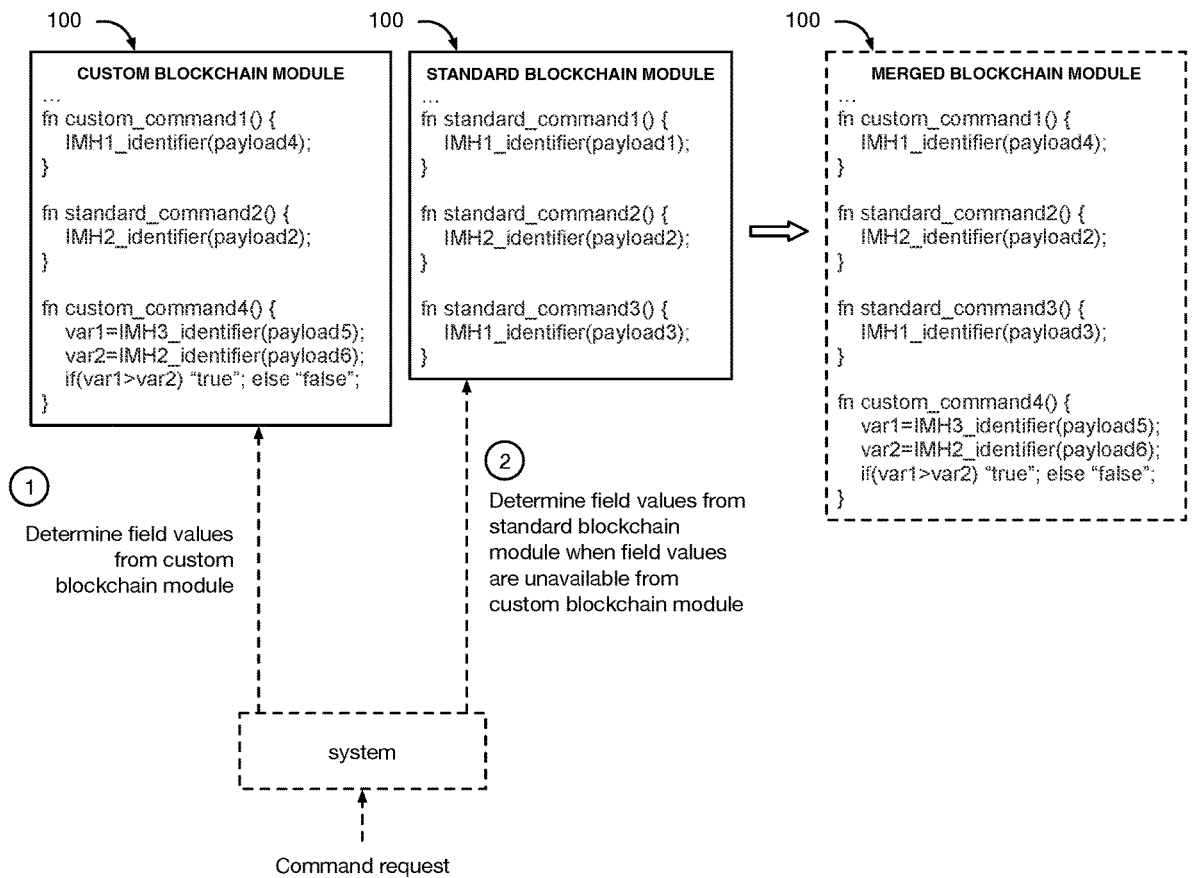
FIG. 11 depicts two illustrative examples of a first and second variant of managing custom blockchain modules: generating a merged blockchain module and preferentially querying the custom blockchain module, respectively.

A blockchain module 100 can be shared between nodes (e.g., of the same blockchain protocol, of the same blockchain, of the same node type, etc.), or be specific to individual nodes. In a first example, all blockchain nodes of the same blockchain type use the same blockchain module. In a second example, all blockchain nodes of the same blockchain type use the same default blockchain module, while a subset of said blockchain nodes can be associated with custom blockchain modules 100. The custom blockchain modules 100 can include custom commands, custom fields (e.g., for standard commands), custom field values (e.g., for standard commands), and/or be otherwise customized (e.g., example shown in FIG. 11). The custom blockchain modules 100 can define values for all standard commands or a subset thereof. The custom blockchain module 100 can be merged with the standard blockchain module (e.g., example shown in FIG. 11), be preferentially used for system command execution (e.g., example shown in FIG. 11), and/or otherwise used. For example, in use, calls to a blockchain node 30 associated with the custom blockchain module 100 can preferentially use the commands and field values defined in the custom blockchain module, then default to using the commands and field values from the standard default blockchain module 100 when the custom blockchain module 100 is missing the command, missing the field value, creates an incorrect blockchain-specific command (e.g., returns an error code), and/or when any other suitable condition is satisfied.

The blockchain modules 100 can be stored in: a centralized repository (e.g., shared storage, wherein the system accesses the centralized repository to access the respective blockchain module 100 each time a system command is called on a blockchain node); a library (e.g., local to the blockchain node, remote from the blockchain node, etc.); on the machine running the node; in user storage; and/or otherwise stored. Each blockchain node 30 sharing common parameters (e.g., the same blockchain protocol, the same blockchain, etc.) can use the same blockchain module 100 instance or use different blockchain module 100 instances.

The blockchain module 100 can be used by: system, a management system (e.g., managing node operation), a set of users (e.g., via an API, a URL call, etc.), an external program (e.g., that calls the system commands according to the program's logic), and/or by any other suitable entity. The blockchain module 100 can be accessed by: a filepath, a blockchain module 100 identifier (e.g., related to or generated from the respective blockchain's identifier or name), a URI (e.g., "blockjoy.com/blockchain/system_command_identifier"), and/or otherwise accessed.

The blockchain module 100 can be manually generated, automatically generated, and/or otherwise generated. In one example, the blockchain module 100 can be automatically generated from the blockchain's API documentation, wherein the blockchain-specific command name (e.g., the blockchain-specific call) is used as the payload value, the API language is used as the interaction mechanism handler, and the API documentation description is used as the system command description. However, the blockchain module 100 can be otherwise generated.

The blockchain module 100 can be a specification, a configuration file (e.g., examples shown in FIG. 4 and FIG. 8), a model, a script (e.g., written in a domain-specific language, meta language, scripting language, etc.; example shown in FIG. 9), and/or have any other suitable configuration. The blockchain module 100 preferably only provides system command values (e.g., which IMH 200 to use, the payload, the port, etc.) and/or response values (e.g., which IMH 200 to use, the expected code, the validation module or logic to use, the check value, etc.) (e.g., is a read-only file), and excludes blockchain-specific commands, but can additionally or alternatively be: a process that executes system command generation and/or response validation; include a set of executable functions; include blockchain-specific commands; and/or include any other suitable information or be any other computational object or process.

Each blockchain module 100 preferably defines a set of blockchain-specific information for each of a set of system commands (e.g., interactions, capabilities, etc.) (e.g., example shown in FIG. 8). The system commands can be: functions, methods, capabilities, and/or otherwise implemented. Each system command preferably implements (e.g., maps to) the same class of interactions with the blockchain node 30 or blockchain, but can alternatively implement different interactions on different blockchains. For example, height( ) can return the block height for any blockchain, and status( ) can return the blockchain node status or health for any blockchain node. The command names can be treated as reserved names, wherein clients can call the same system command on nodes executing different blockchain protocols and receive the same type of information in response. For example, a client can call the same "height( )" system command on both a Bitcoin node and an Ethereum node, and receive the respective block heights in response, without writing any system commands specific to Bitcoin or Ethereum.

The set of system commands (e.g., API calls, functions, methods, etc.) preferably include a set of standard commands (e.g., standardized commands, standardized API calls, etc.), but can additionally or alternatively include a set of custom commands. The standard commands are preferably shared across and included in each blockchain module 100 (e.g., each blockchain module 100 includes the standard commands and includes field values for the standard commands), but can alternatively be included in only subset of the blockchain modules 100. Every blockchain module 100 preferably responds to every standard command (e.g., facilitates blockchain response generation for every blockchain command); alternatively, all blockchain modules 100 can respond to a subset of the standard commands, and/or a subset of blockchain modules 100 can respond to a subset of the standard commands. The custom commands can be specific to the node, specific to the blockchain, specific to the author, and/or otherwise customized.

The set of system commands can include read system commands (e.g., to read information off the blockchain node), write system commands (e.g., to write information to the blockchain via the blockchain node), and/or other system commands. The system commands can operate at the system level (e.g., node management), at the application level (e.g., interact with the blockchain network itself), and/or at any other suitable level. Examples of system commands (e.g., standard commands) that can be defined include: start (e.g., starting the node); stop (e.g., stopping the node); height (e.g., to obtain the block height of the node); health (e.g., to obtain the node health); name (e.g., to obtain the name of the node); address (e.g., to obtain the blockchain address(es) for the node); kill (e.g., to stop the node); kill9 (e.g., to send a SIGKILL signal; to stop the service immediately); status (e.g., to retrieve the node state or status); consensus (e.g., to determine whether the node is currently in consensus); blocktime (e.g., to determine the amount of time it takes to verify transactions within a block); log (e.g., to retrieve a log or state history of the node); get transaction (e.g., to obtain the details for a given transaction); get block (e.g., to obtain the details for a given block); sign (e.g., to sign a transaction); send (e.g., to send a transaction to the blockchain via the node); node list (e.g., to obtain a list of co-owned nodes, a peerbook, etc.); summary calls (e.g., transaction processing fee, balance, blockID, transaction, related transactions, code, proof, consensus state, next consensus, consensus participants, etc.); and/or any other suitable set of standard commands for blockchain interactions.

Each system command can be associated with a set of fields, wherein the field values are blockchain-specific, and are used to construct blockchain-specific commands (e.g., blockchain commands, blockchain calls, etc.).

The set of fields (e.g., system command variables, system command parameters, etc.) can include: which interaction mechanism handler 200 (IMH) to use; a payload; a human-readable description of the system command (e.g., which can be used to automatically generate documentation for the blockchain module); logic (e.g., system command construction logic, system command order logic, etc.); and/or any other information.

Additionally or alternatively, one or more of the fields can be replaced by method calls to a set of platform-standard methods, and/or be otherwise represented. For example, instead of an IMH 200 field, the system command can be associated with (e.g., include) one or more calls to IMH 200 methods. In an illustrative example, instead of specifying "type: JSON-RPC; payload: payload", the system command can specify "run_jsonrpc(payload)".

Each standard command can include or be associated with a set of standard fields. Alternatively or additionally, each standard command can be associated with a set of custom fields (e.g., specific to the blockchain, specific to a user or module author, etc.). Different standard commands are preferably associated with different sets of standard fields, but can alternatively be associated with the same set of standard fields. The set of standard fields can be required (e.g., values must be specified for each standard field), and/or optional. All blockchain modules 100 preferably define values for the set of standard commands; alternatively, some blockchain modules 100 can not define values for the set of standard commands (e.g., wherein the system command can return a null or a default value). In an example, the set of standard fields can include: which IMH 200 to use and a payload, wherein other fields are optional. In another example, the set of standard fields for a sign_transaction system command can include: which signing algorithm to use, the location of the private key, the transaction template, and the IMH 200 to use to send the transaction to the blockchain node, while the set of standard fields for a height system command can include: which IMH 200 to use and the payload. However, the set of standard fields can include any other suitable field.

Each custom command can include or be associated with a set of custom fields. Additionally or alternatively, each custom command can be associated with a set of standard fields. For example, each custom command can be required to specify an IMH 200 and a payload, and can additionally include other fields.

The field values associated with each field are preferably specific to the blockchain of the blockchain module 100 (e.g., each field includes blockchain-specific values or information; each field includes blockchain-specific call values; etc.), but can alternatively be generic across blockchains and/or blockchain modules 100. The field values can be used to generate a blockchain-specific command (e.g., blockchain-specific call, API call, blockchain message, etc.) associated with the standard command, used to process a blockchain response (e.g., into a standardized format), and/or otherwise used.

The field values are preferably for the blockchain-specific command that corresponds to the respective system command (e.g., standard command, custom command, etc.) for the respective blockchain, but can alternatively be a value that is not associated with the blockchain-specific call corresponding to the respective system command. The field values can be explicitly or statically defined, programmatically defined (e.g., use a value bound to an external variable, global variable, or system command input), dynamically defined (e.g., using conditional statements, calculations, sub-functions, etc.), and/or otherwise determined.

Different system commands in the same blockchain module 100 preferably have different field values (e.g., different IMH, different payloads, etc.), but can alternatively have the same field values. The same system commands from different blockchain modules 100 preferably have different field values (e.g., different IMH, different payloads, etc.), but can alternatively have the same field values.

The field values can be automatically determined, manually determined, and/or otherwise determined. In an example, the field values can be determined from the documentation (e.g., API documentation) for the blockchain. For example, when the blockchain supports a JSON RPC client, the system can automatically extract the blockchain-specific calls (e.g., methods) and optionally the blockchain-specific call's parameters, then automatically fill out the field values (e.g., "IMH 200 type: JSON RPC 2.0", "payload:" call_name_from_API_documentation; "run_jsonrpc2.0 (call_name_from_API_documentation(call_parameters_from_API_documentation)); etc.).

The IMH 200 to use can be determined based on the interaction mechanism that is supported by the respective blockchain protocol, or otherwise determined. The IMH 200 can be automatically determined or manually determined. The IMH 200 can be specified on a per-system command basis (e.g., useful for blockchains where different system commands are only available through different interaction mechanisms, or blockchains where system commands use a different interaction mechanism from responses, etc.), or be specified for the blockchain module 100 as a whole. The IMH 200 can be specified as: a value (e.g., "type: gRPC"), a method (e.g., "run_gRPC( )"), and/or otherwise specified.

The payload ("body") preferably includes a blockchain-specific value, such as the blockchain protocol's name for the analogous interaction, but can additionally or alternatively include a variable (e.g., wherein the variable value can be passed by the client), or any other information.

For example, the "address" system command for an Ethereum blockchain module 100 can include: IMH: "json-rpc", payload: "eth_accounts", and description: "return a list of addresses for the Ethereum node". In another example, the "address" system command for a Helium blockchain module 100 can include: IMH: "json-rpc", payload: http://localhost:4467/peer_addr, and description: "get the address of the Helium node". In another example, the "transaction" system command for a Ethereum blockchain module 100 can include:
  IMH: "json-rpc",
  payload:" "from": "SENDER_VARIABLE", "to": "RECIPIENT_VARIABLE", "gas": "GAS_VARIABLE", "gasPrice": "GASPRICE_VARIABLE", "value": "VALUE_VARIABLE", "data": "DATA_VALUES"
  description: "sending an Ethereum transaction where the values for the SENDER_VARIABLE, RECIPIENT_VARIABLE, GAS_VARIABLE, GASPRICE_VARIABLE, VALUE_VARIABLE, and DATA_VALUES variables can be passed by a client or otherwise obtained.

In another example, the payload can include a set of logic. In a first specific example, the payload can include a set of variables, wherein the variable values are set by another process, command, or set of logic (e.g., wherein the variable can be a block height retrieved by another command, and the command uses the block height as the payload). In a second specific example, the payload can include conditional logic, wherein the specific payload value to use can be determined based on evaluation of the conditional logic.

However, the system commands defined in each blockchain module 100 can be otherwise configured.

Each blockchain module 100 can optionally define a set of command responses, which can be used to generate system responses based on the blockchain-specific responses received from the blockchain node 30 or blockchain network. A blockchain module 100 can define command responses for each system command, define a generic command response, and/or define any other suitable set of command responses. Alternatively, the blockchain module 100 can not define a set of command responses. Each command response can include a set of command response fields, which can be used to generate a system response, verify that the received response was an expected response, and/or be otherwise used. The blockchain module 100 can include a command response for all or a subset of the system commands. The generated system responses are preferably standardized, such that the same system command for different blockchain modules 100 generates the same set of system response fields (e.g., in the same format), but can alternatively be customized. An example of the system response is shown in FIG. 10.

The set of command response fields can include: the IMH 200 to use to interpret the response, the expected code value (e.g., code mapping, "0", "200", etc.), the response field of interest (e.g., the blockchain or blockchain node response field mapping; which blockchain or blockchain node response field to analyze; etc.), response evaluation logic, the validation values to validate against, and/or any other suitable command response field.

The value specified in the response field of interest can be: a specific field identifier (e.g., the field name, the field index, etc.) for the blockchain's response; a generic identifier (e.g., wherein the entire response is analyzed); a pattern (e.g., regex); and/or any other suitable identifier. This can function to normalize the responses from different blockchains into a standard ontology, or confer other benefits. Additionally or alternatively, the response field mapping can be performed by the respective IMH.

The value specified in the response evaluation logic can be: the logic itself, an evaluation logic module identifier (e.g., wherein the evaluation logic module includes the evaluation logic), and/or any other suitable data. Additionally or alternatively, the response evaluation logic can be performed by the respective IMH. The response evaluation logic can include: a set of checks, a set of secondary calls (e.g., to secondary system commands, to external systems, etc.), analysis logic (e.g., analyzing the blockchain response values, analyzing the secondary call response values, etc.), response logic (e.g., specifying the response value, calculating the response value, etc.), coordination logic (e.g., to coordinate actions between a set of other components or entities), and/or any other suitable logic. The response evaluation logic can be defined programmatically (e.g., using a scripting language, etc.), graphically, and/or otherwise defined. The response evaluation logic can be: default logic, user-specified logic (e.g., manually specified), automatically-defined logic (e.g., extracted from the blockchain's API documentation, etc.), and/or otherwise determined. In a first example, the response evaluation logic can validate the blockchain response value, wherein the evaluation logic compares the blockchain response field value against the validation value and returns a first response when the values match, and returns a second response when the values do not match. In a second example, the response evaluation logic can include a set of secondary calls to other system commands, and generates a response based on the blockchain responses to the secondary calls (e.g., wherein the blockchain requests to the secondary calls can be interpreted using the other system commands' response fields). In a third example, the response evaluation logic can include a set of conditional statements, wherein the returned response value is dependent on whether the respective condition is satisfied (e.g., by an input parameter value received with the system command call, by a retrieved value, by the blockchain response value, etc.).

The value specified for the check value can be: a single value, an array of values, a variable (e.g., wherein the value is provided by a client or other datasource), and/or any other suitable value.

However, the blockchain module 100 can specify any other suitable response parsing, validation, and/or processing information for a given blockchain response.

Each blockchain module 100 can additionally include blockchain node configuration parameters, which can be used to provision, configure, run, and/or otherwise manage the blockchain node 30 (e.g., the blockchain node process). The blockchain configuration parameters can include: the computing resource allocation (e.g., minimum computing resource allocation, maximum computing resource allocation, required computing resource allocation, recommended computing resource allocation, a computing resource score, resource allocation for a blockchain state, conditional resource allocation, etc.), the filepath for the blockchain node image, the filepath for the blockchain protocol, timeout duration, computing resource allocation duration, and/or any other suitable set of configuration parameters. The blockchain configuration parameters can be for: the blockchain node, each system command defined in the blockchain module, and/or defined at any other suitable level of specificity. For example, the blockchain module 100 can specify the type of processing unit (e.g., GPU, CPU, TPU, IPU, etc.), the number of cores, the amount of cache, the amount of RAM, and/or the amount and/or type of computing resources to use for the respective blockchain node(s). In another example, the blockchain module 100 can specify the type of processing unit (e.g., GPU, CPU, TPU, IPU, etc.), the number of cores, the amount of cache, the amount of RAM, and/or otherwise specify the computing resource allocation to use for one or more system commands (e.g., each standardized command). In an illustrative example, the blockchain modules 100 can specify the computing resource allocation to be used when consensus is detected or for transaction submission. In another example, the blockchain module 100 can specify the cloud storage bucket that the blockchain node image is stored in (e.g., such that all blockchain nodes that are provisioned using the blockchain module 100 use the same blockchain node image). The blockchain configuration parameter values are preferably different for different blockchain modules 100 (e.g., different blockchains), but can alternatively be the same.

In variants, the management system can use the configuration parameters to provision and/or manage blockchain node operation (e.g., allocate computing resources based on the specified computing resource allocation, use the blockchain node image specified by the filepath to provision the blockchain node, etc.). The configuration parameters can be manually specified, learned (e.g., by observing the computing resource requested by a node of the same blockchain type responsive to a respective command), extracted from blockchain-specific documentation, and/or otherwise determined.

However, the blockchain modules 100 can be otherwise defined and/or used.

The interaction mechanism handlers (IMH) function to generate the blockchain-specific command (e.g., blockchain-specific call, etc.) based on the information in the blockchain's blockchain module. The blockchain-specific call can be a blockchain node call (e.g., to interact with the blockchain node itself), a blockchain call (e.g., to interact with the blockchain connected to the node), and/or any other suitable call. The blockchain-specific call is preferably in a blockchain's native protocol (e.g., compliant with the blockchain's API), but can alternatively be in a system-standard protocol (e.g., in an ETL protocol) and/or be in any other suitable protocol. The IMH 200 preferably construct the blockchain-specific calls just-in-time (e.g., in real- or near-real time), which can function to immediately propagate any changes in the IMH 200 or the blockchain module. Alternatively, the IMH 200 can preconstruct the blockchain-specific calls and cache them for future use.

IMHs can optionally interpret blockchain responses (e.g., map blockchain responses to system response fields, extract response values from the blockchain response, interpret the blockchain response values, etc.), call other modules (e.g., validation modules identified in the blockchain module 100 for the response), execute scripts, and/or perform any other suitable functionality.

The IMHs are preferably shared across different blockchain modules 100, blockchains, nodes, and/or entities (e.g., users), but can alternatively be specific to a given blockchain module, blockchain, and/or node. Alternatively, one or more of the IMHs can be custom (e.g., defining custom templates, field mapping, etc.) for different blockchain protocols, blockchain nodes, users, blockchain modules 100 and/or otherwise customized. The system can include one or more IMHs. Each IMH 200 is preferably specific to an interaction mechanism, but can alternatively be shared across different interaction mechanisms. The system can include one or more IMHs per interaction mechanism. Examples of interaction mechanisms that IMHs can be built for include: message passing mechanisms, transport layers, and/or other interaction mechanisms. Examples of message passing mechanisms that can be supported include: scripts (e.g., shell, curl), message passing protocols or frameworks, and/or other message passing mechanisms. Examples of message passing protocols or frameworks can include: RPC frameworks (e.g., gRPC, JSON-RPC, etc.), GraphQL, REST, Apache Dubbo, Tars, versions thereof (e.g., JSON-RPC 1.0, JSON-RPC 2.0, etc.), and/or any other suitable message passing protocols or frameworks.

The IMHs can be: modules (e.g., stored in a module repository, applications, etc.), methods (e.g., system sub-methods, stored in a library or binary, etc.), and/or otherwise configured. The IMHs can be stored: in a centralized repository (e.g., wherein each call accesses the same centralized repository to use the IMHs), in a library (e.g., local to the blockchain node, remote from the blockchain node, etc.), and/or otherwise stored. In a first example, the IMH 200 can be accessed by identifying the IMH 200 name in the blockchain module, wherein the system looks up the respective IMH. In a second example, the IMH 200 can be accessed by calling a method (e.g., "run_grpc( )", "run_sh", etc.), wherein the IMH 200 methods can be imported from a library, be native to the execution system, and/or otherwise accessed.

Each interaction mechanism handler 200 can define a set of command templates (e.g., interaction mechanism templates), wherein information values from the blockchain modules 100 are filled into the template fields. The templates are preferably specific to the respective interaction mechanism (e.g., the respective shell script, the respective message passing mechanism, etc.), but can alternatively be generic. Alternatively, the IMHs can construct the calls using tools for the IMH's respective mechanism (e.g., using the message passing protocol). The IMH 200 can include: a generic set of system command templates shared across all standard commands and/or all blockchain protocols; different system command templates for each standard command (e.g., a system command template for "address", a system command template for "height", etc.) or subsets thereof; different system command templates for each blockchain protocol; and/or different templates for any other subset of specific system commands.

For example, the IMH 200 can include a generic system command template of {"jsonrpc":"2.0","method":"PAYLOAD","params":[ ],"id":PORT}. In this example, when the same "height( )" system command is called on a Bitcoin and Ethereum node, the respective blockchain modules 100 both specify JSON-RPC as the IMH, the Bitcoin blockchain module 100 specifies "getblockchaininfo" as the height payload and the Ethereum blockchain module 100 specifies "eth_blockNumber" as the height payload, then the JSON-RPC IMH 200 can generate the following system commands for the Ethereum and Bitcoin nodes, respectively: {"jsonrpc": "2.0", "method":"eth_blockNumber", "params":[ ],"id":83}, and {"jsonrpc":"2.0", "method": "getblockchaininfo", "params": [ ],"id": 83}.

In an illustrative example, the JSON-RPC IMH 200 can include a template that includes: curl-X POST-data {"jsonrpc":"2.0", "method":"PAYLOAD", "params": [PARAMETERS], "id":ID}, where the PAYLOAD value (e.g., the blockchain-specific call) is retrieved from the respective blockchain module 100 (e.g., example shown in FIG. 4), the PARAMETERS can be predefined or dynamically determined (e.g., retrieved from the blockchain module, determined an input parameter value, etc.), and the ID can be determined from an input parameter value, or otherwise determined. In a specific example, when a storage( ) system command is called for a blockchain (e.g., Ethereum), the IMH 200 can generate the following call: curl-X POST-data {"jsonrpc":"2.0", "method":"eth_getStorageAt", "params": ['ox407d73d8a49eeb85d32cf465507dd7id507100c1', 'oxo', '0x2' ], "id":1}, wherein the payload, the parameters, and the id are obtained from the blockchain module.

In another illustrative example, a curl script IMH 200 template can include: curl LOCALHOST-X POST-H "Content-Type: application/json"-d ' {"id":ID, "jsonrpc":"2.0", "method":"PAYLOAD", "params":[{PARAMETERS}]}. In a specific example, when a getLatestBlockHash( ) command is called for a blockchain (e.g., Solana), the curl script IMH 200 can generate the following blockchain-specific call: curl http://localhost:8899-X POST-H "Content-Type: application/json"-d' {"id":i, "jsonrpc":"2.0", "method": "getLatestBlockHash", "params": [{"commitment: "processed}]}, wherein the payload, the parameters, and the id are obtained from the blockchain module, and the localhost can be provided by the system calling the IMH 200 or otherwise provided.

However, the IMHs can construct the system commands in any other suitable manner.

The system can optionally include a set of validation modules, which can be used to validate the responses provided by the blockchains. The validation modules can be called by the client or other process (e.g., wherein the client identifies which validation module to use based on the blockchain module 100 and validates the response field value, extracted by the response's IMH, using said validation module; e.g., example shown in FIG. 7)); by an IMH 200 (e.g., example shown in FIG. 7); and/or by any other component. The validation modules are preferably shared across blockchains, nodes, blockchain modules 100, IMHs, and/or otherwise shared, but can alternatively be specific to any of the above. The validation module(s) to use for response validation is preferably specified in the blockchain module 100 for the respective blockchain generating the response, more preferably in the response interpretation information for the specific system command response (e.g., in the validation logic field), but can alternatively be specified by the system or otherwise determined. The response values are preferably validated against a check value specified in the blockchain module 100 for the respective blockchain generating the response, but can alternatively be validated against a default value, and/or any other suitable value. Each validation module preferably executes a different set of validation logic, but can alternatively execute the same set of validation logic. Examples of validation logic that can be implemented in the validation modules include: regular expressions, checksums, hashing algorithms, and/or any other validation logic.

Figure 6:
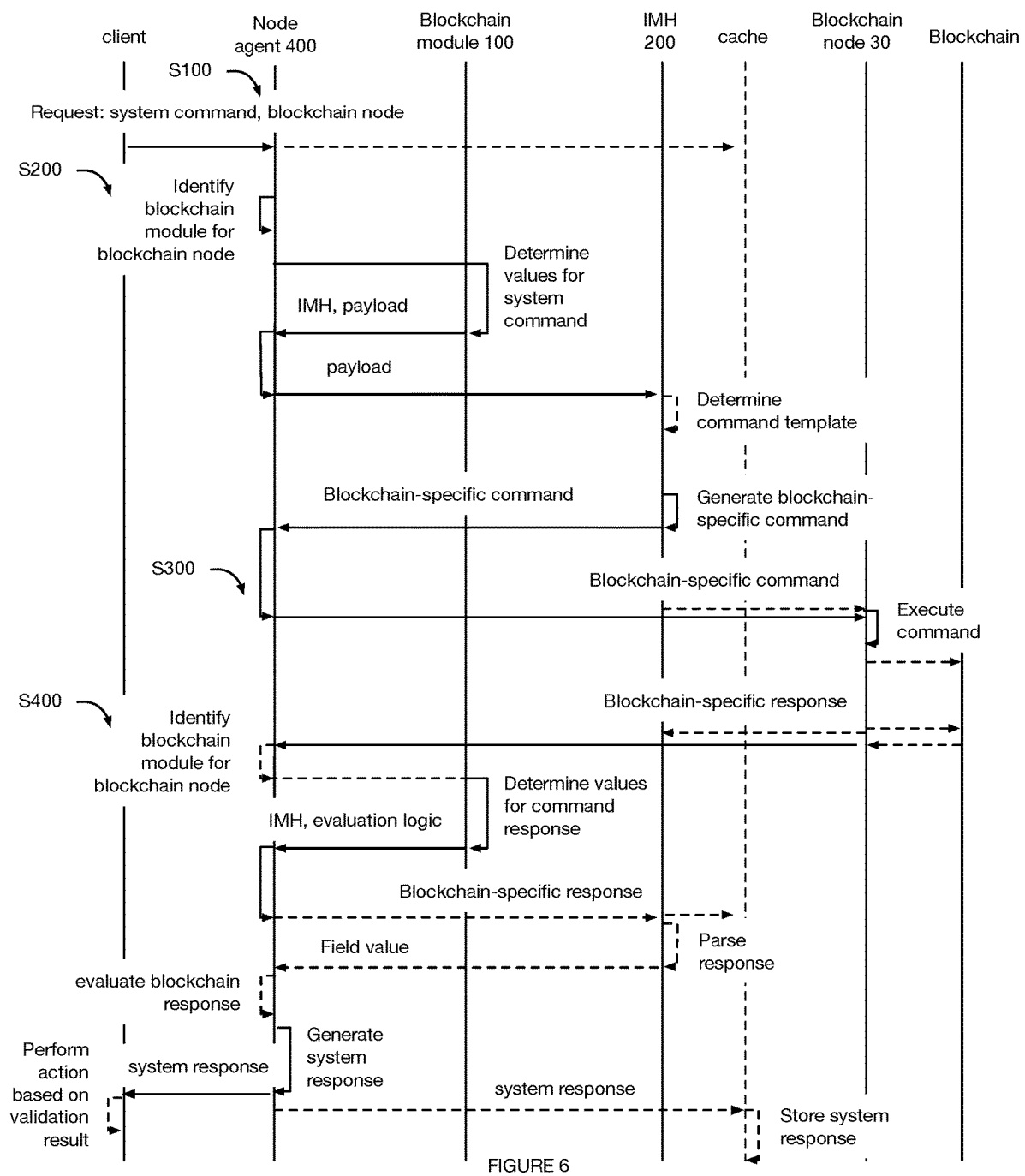
FIG. 6 is an illustrative example of generating a blockchain-specific command for a standard command, parsing a blockchain-specific response into a standard response, and optionally caching the blockchain-specific response to respond to future requests.

The system can optionally include one or more node agents (e.g., Blockvisor daemon), which function to coordinate system command receipt, blockchain-specific command construction, system response generation, system response return, and/or perform other functionalities (e.g., examples shown in FIG. 2 and FIG. 6). The system can include one or more node agents. Each node agent 400 can be associated with (e.g., communicatively connected to): a single blockchain node, a set of blockchain nodes (e.g., sharing a machine, sharing a virtual environment, sharing a blockchain protocol, etc.), and/or any other suitable number of blockchain nodes. Each blockchain node 30 is preferably associated with a single node agent, but can alternatively be associated with multiple node agents. Each node agent 400 can run alongside the associated blockchain node(s), such as within the same process or within the same virtual environment (e.g., same container, virtual machine, etc.), but can alternatively run remote from the blockchain nodes.

In variants, a node agent 400 can: receive a system command (e.g., from an external program, a user, another blockchain module, the system, etc.) for a node (e.g., the associated node); identify the blockchain module 100 associated with the node; coordinate blockchain-specific command determination using the field values associated with the system command in the blockchain module; and send the blockchain-specific command to the node (e.g., identified in the initial request). Coordinating blockchain-specific command determination can include identifying the IMH 200 to use (for the system command, from the blockchain module); determining the IMH 200 parameter values to pass to the IMH 200 (e.g., the payload, parameters, id; etc.); and calling the IMH 200 using the IMH 200 parameter values. Alternatively, coordinating blockchain-specific command determination can include looking up the blockchain-specific command associated with the system command in the blockchain module, or otherwise coordinating blockchain-specific command determination.

In variants, the node agent 400 can optionally receive the blockchain-specific response from the node, identify the blockchain module 100 associated with the node; coordinate system response generation using the response field values associated with the system command in the blockchain module; and return the system response. Coordinating system response generation can include: optionally determining the blockchain module 100 to use; optionally determining the IMH 200 to use (for the system command or response, from the blockchain module); optionally mapping the blockchain-specific response fields to system response fields using the blockchain module 100 (and/or sending the blockchain-specific response to the identified IMH); optionally evaluating the response field values (e.g., blockchain-specific response field values or system response field values) using the evaluation logic (or module) specified in the blockchain module; and returning a system response, wherein the system response can be the system response field values, the result of the evaluation, and/or any other suitable response.

However, the node agent 400 can be otherwise configured.

The system can optionally include one or more management systems, which function to manage the computing environment running one or more blockchain nodes. The system can include one or more management systems. The management system can be a process, a processing system, and/or be otherwise configured. The management system preferably executes locally on the machine running the node, but can alternatively be remote from the machine running the node. The management system can control the node process, the virtual environment that the node is executing within, the kernel hosting the node, the bare metal machine hosting the node, and/or any other suitable component of the computing stack. For example, the management system can allocate computing resources to a blockchain node 30 according to the computing resource allocation specified in the blockchain node's blockchain module. In another example, the management system can monitor the node state (e.g., using the system commands, by monitoring the node process, etc.), and dynamically allocate computing resources to the blockchain node (e.g., as described in U.S. application Ser. No. 18/190,259 filed 27 Mar. 2023, incorporated herein in its entirety by this reference; using another method; etc.). In another example, the management system can allocate computing resources to the blockchain node 30 according to the computing resource allocation specified by the respective blockchain module 100 for a requested system command. The computing resources are preferably allocated before the corresponding blockchain-specific command is sent to or executed on the blockchain node, but can alternatively be allocated during blockchain-specific command execution or at any other suitable time. However, the management system can be otherwise configured.

The system can optionally include one or more caches, which function to store: blockchain-specific responses, system responses, blockchain-specific commands, and/or any other suitable information. The caches can be geographically dispersed, geographically collocated with the blockchain nodes (that the cache stores information for), geographically remote from said blockchain nodes, and/or otherwise located. The cache can store the information: temporarily (e.g., until the next value overwrites the stored value); permanently; and/or for any other suitable duration. The cache can be written to by: a node agent, the system, a user, and/or by any other suitable entity. The cache can be read from by: a node agent, the system, a user, and/or by any other suitable entity. The cache can be accessed using: a filepath, URI, and/or any other suitable identifier.

However, the system can include any other suitable set of components, and/or be otherwise constructed.

4. Method

Figure 5:
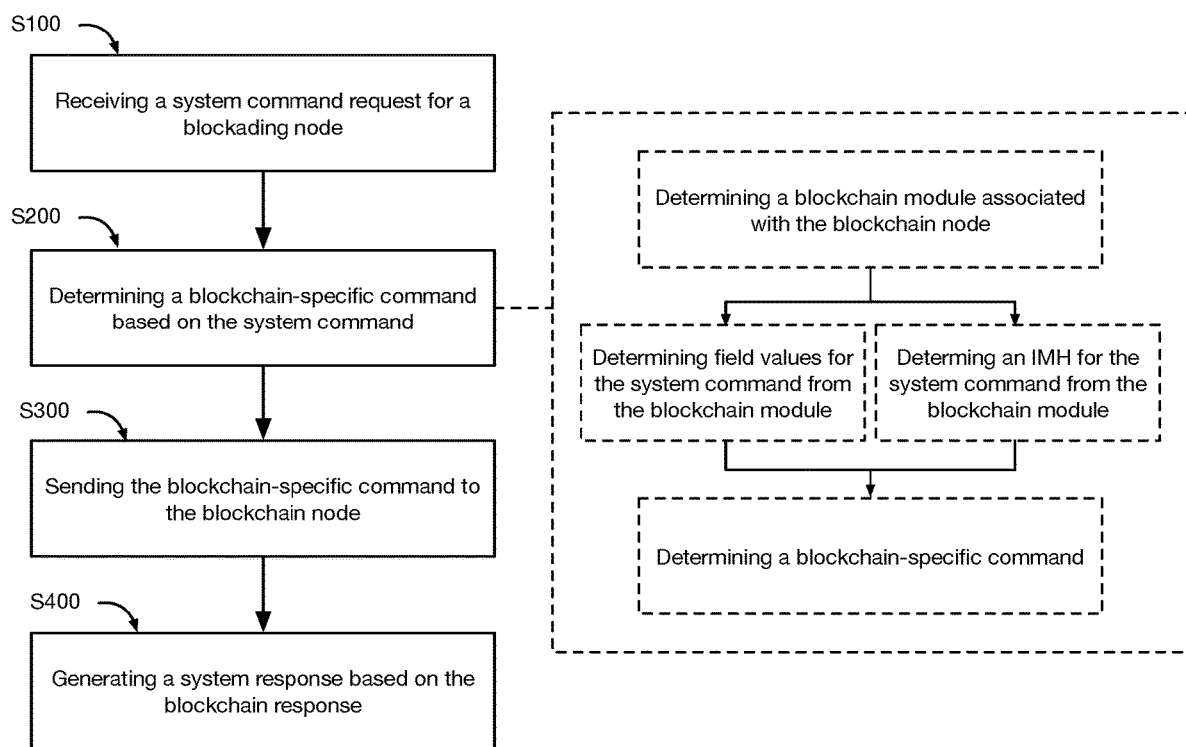
FIG. 5 is a schematic representation of an variant of the method.
Figure 7:
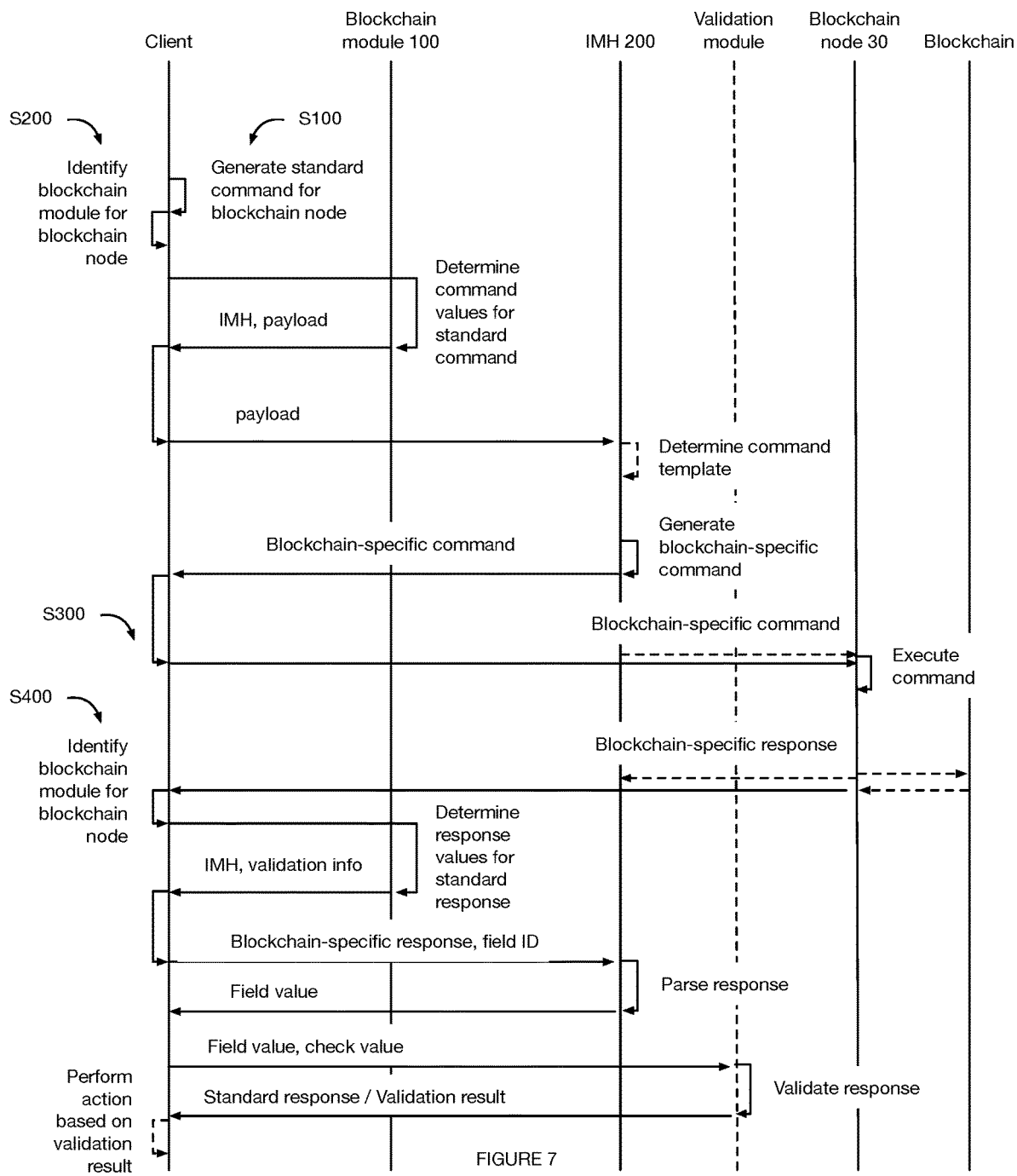
FIG. 7 is an illustrative example of generating a blockchain-specific command for a standard command and parsing a blockchain-specific response into a standard response.

As shown in FIG. 5, in variants, the method for unified blockchain node interaction can include: receiving a system command request for a blockchain node S100; determining a blockchain-specific command based on the system command S200; sending the blockchain-specific command to the blockchain node S300; and optionally generating a system response based on the blockchain response S400 (e.g., illustrative examples shown in FIG. 6 and FIG. 7). However, the method can include other steps and/or processes. The method functions to enable interactions (e.g., direct interactions) with a heterogenous set of blockchain nodes and/or blockchains using a unified set of system commands (e.g., a unified API, a unified ontology, etc.).

The method can be performed when the system command request is received, or at any other suitable time. All or portions of the method can be performed in real- or near-real time (e.g., responsive to a request), iteratively, concurrently, asynchronously, periodically, and/or at any other suitable time. All or portions of the method can be performed automatically, manually, semi-automatically, and/or otherwise performed.

All or portions of the method can be performed by all or components of the system described above. All or portions of the method can be performed by the node agent 400 (e.g., example shown in FIG. 6), by the management system, by a higher-level system (e.g., controlling the node agents), by a platform, by an entity, by the client (e.g., example shown in FIG. 7), by a machine, by a user, and/or by any other suitable system. The method can be performed using the blockchain modules 100, the IMHs 200, and/or any other suitable system component.

The method can be performed for one or more times, for one or more blockchain nodes. The method can be repeated for different system commands for the same blockchain node, repeated for different blockchain nodes for the same system command (e.g., using different blockchain modules, payloads, IMHs, etc.), and/or otherwise repeated. In an example, the method can be repeated for a second standard command for the same blockchain, wherein the second standard command can be associated with a second IMH and payload different from the first IMH and payload. In this example, the second IMH and payload are used to construct the second blockchain-specific command.

The blockchain nodes used with the method can be managed by the system (e.g., by the platform), be managed by a third party (e.g., wherein the third party accesses all or part of the system to construct the blockchain-specific calls), and/or managed by any other suitable system. The blockchain nodes used with the method can be owned by one or more sets of users.

Receiving a system command request for a blockchain node S100 functions to determine a desired interaction with the blockchain node. The interaction can be a system interaction (e.g., an interaction with the blockchain node itself), an application interaction (e.g., an interaction with the blockchain connected to the blockchain node), and/or be any other suitable interaction. The system command request can be received: by the node agent associated with the blockchain node (e.g., wherein the request can be routed to the node agent by a routing system); by the platform; by the blockchain node itself; and/or by any other suitable system. The system command request can be received from (e.g., generated by): an external program (e.g., a blockchain monitoring program, an ETL system, a user-written program, a client, etc.; during execution, etc.), a user (e.g., generated manually; from an API, a graphical interface, etc.), a third party, a blockchain module (e.g., associated with the blockchain node, associated with a different blockchain, etc.), a system associated with another blockchain, the platform, higher-level logic, and/or any other suitable entity.

The system command request can be received as an API call, as a call to a URI endpoint, and/or otherwise received. In examples, the system command request can be in the following formats: "blockchain_node_identifier. system_command", "https://domain.com/blockchain/system_command" (e.g., example shown in FIG. 10), "https://blockchain_node_identifier/system_command", and/or any other suitable format.

The system command request can include: a system command, a blockchain node identifier, a blockchain identifier, auxiliary payloads (e.g., transaction information, smart contract information, etc.; which can be passed to the IMH or otherwise used for blockchain-specific command construction), and/or any other suitable information. The blockchain node identifier can include: the blockchain node address, the blockchain identifier (e.g., wherein any blockchain node connected to the identified blockchain can be treated as the blockchain node), the process identifier, and/or any other suitable identifier. In a first example, the system command request includes a system command identifier and a blockchain node identifier (e.g., {" . . . x9bo, health"}, {"network: Ethereum 2.0, submit_transaction, {to: . . . 2a1b, from: . . . 7bae, amount: 0.25}}, etc.). In a second example, the system command request includes a system command identifier and a blockchain (e.g., "solana/glbh", etc.) However, the system command request can include any other suitable information in any other suitable format.

However, the system command request can be otherwise received.

Determining a blockchain-specific command based on the system command S200 functions to dynamically convert the system command request into a command that is interpretable by the blockchain node. The blockchain-specific command can be determined by: the node agent, an IMH, the platform, blockchain node itself, a user, and/or by any other suitable entity or system. The blockchain-specific command is preferably determined after (e.g., in response to) receiving the system command request (e.g., immediately after receiving the system command request, just-in-time, in real- or near-real time, etc.), but can alternatively be performed before receiving the system command request (e.g., wherein a pre-determined blockchain-specific command can be retrieved responsive to system command request receipt), asynchronously with system command request receipt, and/or be performed at any other suitable time.

Determining the blockchain-specific command based on the system command can include: determining a blockchain module associated with the blockchain node; determining field values for the system command from the blockchain module; and determining the blockchain-specific command using the field values. However, the blockchain-specific command can be otherwise determined.

Determining a blockchain module associated with the blockchain node functions to determine instructions for how to convert (e.g., translate) the system command into a blockchain-specific command interpretable by the blockchain node. In a first variant, determining the blockchain module includes determining the blockchain (e.g., blockchain protocol) associated with the blockchain node (e.g., from a database storing blockchain nodes and their associated blockchains; by querying the node; from the request, wherein the request identifies the blockchain; etc.), and identifying a blockchain module associated with the blockchain. In a second variant, determining the blockchain module includes looking up the blockchain module associated with the blockchain node, wherein the blockchain node-blockchain module relationship can be stored in a database. In a third variant, determining the blockchain module can include determining the blockchain module from the blockchain node, such as by retrieving the blockchain module from the blockchain node storage, or retrieving a blockchain module identified by the blockchain node. In a fourth variant, determining the blockchain module can include retrieving a custom blockchain module for the blockchain node (e.g., wherein the custom blockchain module is associated with an owner or user associated with the blockchain node, is identified by the blockchain node or associated agent, is stored in association with the blockchain node or blockchain node identifier, and/or otherwise associated with the blockchain node), and optionally also retrieving a standard blockchain module for the blockchain node (e.g., the blockchain module associated with the blockchain node's blockchain). In this variant, the field values from the custom blockchain module can be preferentially used to construct the blockchain-specific command, wherein the standard blockchain module can be used when the custom blockchain module lacks values for the system command, fails to generate a valid blockchain-specific command, and/or is otherwise used. In a fifth variant, determining the blockchain module can include accessing the library, file, class, or method for the blockchain module. The determined blockchain module can optionally be accessed (e.g., retrieved, read from, etc.). However, the blockchain module can be otherwise determined.

Determining field values for the system command from the blockchain module functions to determine the blockchain-specific values that can be used to construct a blockchain-specific command corresponding to the system command. The field values are preferably determined from the section for the system command within the blockchain module (e.g., system command section, submethod, sublibrary, etc.), but can alternatively be default values, be determined from documentation for the blockchain protocol, and/or otherwise determined. The field values can be: retrieved, read, called, requested, and/or otherwise obtained from the blockchain module. In a first variant, the field values can include: an IMH, payload, parameter values, id values, and/or any other suitable information needed to construct the blockchain-specific command. In a second variant, the field values can include the blockchain-specific command itself. However, the field values can be otherwise determined.

Determining the blockchain-specific command using the field values functions to generate the blockchain-specific command. The blockchain-specific command is preferably generated by the IMH, but can alternatively be generated by the node agent, platform, blockchain module, and/or any other suitable system. In a first variant, determining the blockchain-specific command can include passing the field values to the identified IMH, wherein the IMH constructs the blockchain-specific command using the IMH's template and the field values. In a second variant, determining the blockchain-specific command can include extracting the blockchain-specific command from the blockchain module. However, the blockchain-specific command can be otherwise constructed.

However, the blockchain-specific command can be otherwise determined based on the system command.

Sending the blockchain-specific command to the blockchain node S300 functions to directly interact with the blockchain node, in the native blockchain protocol. The blockchain-specific command can be sent by: the platform to the blockchain node (e.g., routed using the blockchain node's identifier, etc.); the node agent of the blockchain node; an external system or requesting client (e.g., wherein the blockchain-specific command is returned to the external system, and the external system sends the blockchain-specific command to the blockchain node); the IMH, the and/or otherwise sent to the blockchain node. The blockchain-specific command can be sent: once, multiple times, within a predetermined time window after blockchain-specific command construction, and/or at any other suitable time. However, the blockchain-specific command can be otherwise sent to the blockchain node.

The method can optionally generating a system response S400, which functions to return a response in a standardized format. The system response is preferably generated based on the blockchain-specific response returned by the blockchain node (e.g., responsive to the blockchain-specific command), but can alternatively be a calculated response, be a default response (e.g., a predetermined response), and/or be otherwise determined. The system response can be generated by: the IMH (e.g., the IMH used to generate the system command, an IMH specified for the response specified in the blockchain module, etc.), the blockchain module, the node agent, the platform, an external system, the requesting client, a combination thereof, and/or any other suitable system. The system response is preferably generated using the response information specified by the blockchain module (e.g., for the response to the standard command, for a general response from the blockchain, etc.), but can additionally or alternatively be generated using an IMH associated with a value in the blockchain-specific response header, and/or be otherwise generated.

Generating the system response based on the blockchain-specific response can include: identifying blockchain-specific response fields of interest (e.g., identified by the blockchain module, by the IMH used to generate the system command, etc.); and generating a system response based on the values within the fields of interest. The system response can include: the values within the fields of interest, the result of an evaluation of the values within the fields of interest (e.g., using the evaluation logic in the blockchain module, by the IMH, etc.), a semantic interpretation of the values within the fields of interest (e.g., "fail", "success", etc.), and/or any other suitable data. For example, the method can include determining the validation module, associated with the response to the system command, from the blockchain module; determining the values to validate against (e.g., code values, check values, etc.) from the blockchain module; and validating the parsed blockchain-specific response using the validation module and validation values (e.g., by validating the field values against the validation values using the validation module).

However, the system response can be otherwise generated.

The method can optionally include caching the blockchain-specific response or system response in a cache, and returning cached response responsive to a subsequent request for the system command for the blockchain node (and/or blockchain). This can be used to reduce the load on the blockchain node itself, to increase the response latency (e.g., when the blockchain node is located in a different geographic region or country from the system command request origin), and/or otherwise used.

However, the method can be otherwise performed.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A system, comprising:
a processing system; and
a non-transitory computer readable medium storing instructions executable by the processing system, comprising:
a set of standardized API calls for interacting with each of a plurality of blockchains; and
a blockchain module for each of the plurality of blockchains, wherein each blockchain module comprises a set of blockchain-specific call values for each of the set of standardized API calls, wherein each set of blockchain-specific call values is used to construct a blockchain-specific call responsive to receipt of the respective standardized API call for a blockchain node associated with the respective blockchain protocol, wherein each blockchain module further comprises response evaluation logic for the standard API call, wherein a response from the blockchain node is interpreted using the response evaluation logic from the blockchain module for the blockchain protocol.

2. The system of claim 1, wherein each blockchain module further comprises a computing resource allocation for the blockchain node.

3. The system of claim 2, wherein the processing system is configured to allocate the computing resource allocation to the blockchain node.

4. The system of claim 2, wherein different blockchain modules comprise different computing resource allocations.

5. A method, comprising:
receiving a standardized call for a blockchain node;
determining a blockchain module for the blockchain node;
determining a set of blockchain-specific call values, for the standardized call, from the blockchain module;
determining a blockchain call using the set of blockchain-specific call values;
sending the blockchain call to the blockchain node; and
interpreting a blockchain response from the blockchain node comprises:
extracting response values from the blockchain response; and
interpreting the response values according to response evaluation logic, for the standardized call, from the blockchain module.

6. The method of claim 5, wherein determining the blockchain module for the blockchain node comprises: determining the blockchain module for the blockchain associated with the blockchain node, wherein different blockchains are associated with different blockchain modules.

7. The method of claim 5, further comprising determining a message passing format, associated with the standardized call, from the blockchain module; wherein determining the blockchain call comprises constructing the blockchain call using the message passing format.

* * * * *